United States Patent [19]

Harkness et al.

[11] 3,971,353
[45] July 27, 1976

[54] BENDIX-TYPE ENGINE STARTER WITH MECHANICAL LOOKOUT TO PREVENT UNDESIRED STARTING OF ENGINE

[75] Inventors: Joseph R. Harkness, Germantown; Robert Couchman, Jr., Menomonee Falls, both of Wis.

[73] Assignee: Briggs & Stratton Corporation, Wauwatosa, Wis.

[22] Filed: Feb. 7, 1975

[21] Appl. No.: 548,162

[52] U.S. Cl. ............................. 123/179 K; 74/850
[51] Int. Cl.² ........................................ F02H 3/00
[58] Field of Search ...... 123/179 K, 179 SE, 185 R, 123/185 A; 74/7 B, 7 C, 850

[56] References Cited
UNITED STATES PATENTS

| | | | |
|---|---|---|---|
| 3,518,979 | 7/1970 | Harkness | 123/185 R |
| 3,521,612 | 7/1970 | Santi et al. | 123/179 K |
| 3,739,763 | 6/1973 | Berry et al. | 123/179 K |
| 3,782,350 | 1/1974 | McBride | 123/179 K |

*Primary Examiner*—Wendell E. Burns
*Assistant Examiner*—David D. Reynolds

[57] ABSTRACT

A mechanical lock-out by which a Bendix-type starter for an internal combustion engine is rendered incapable of starting the engine if mechanism - such as the propulsion system of a power lawn mower or tractor - has been drivingly connected with the engine. The lock-out comprises a lever pivoted to the housing of the starter with a part thereof in the path of the driving pinion of the starter as it advances towards meshing engagement with the ring gear on the engine flywheel, so that the lever must be free to move with the advancing driving pinion for the starter to be operative, and a blocking member, also pivotally mounted on the housing of the starter, for movement to and from an operative position preventing such movement of the lever. A Bowden wire connects the blocking member with a manually shiftable control by which the driving connection between the mechanism to be driven and the engine is activated, to move the blocking member to its operative position as a consequence of establishing the driving connection. Resilient yieldability incorporated in the blocking member prevents damage to the mechanism in the event the blocking member is moved into its operative position after the starter has been activated.

11 Claims, 4 Drawing Figures

BENDIX-TYPE ENGINE STARTER WITH MECHANICAL LOOKOUT TO PREVENT UNDESIRED STARTING OF ENGINE

This invention relates generally to small internal combustion engines of the type used on engine-powered lawn and garden equipment, and pertains more specifically to a lock-out mechanism by which starting of the engine is prevented when it is drivingly connected with mechanism which, in use of the equipment, is engine-powered - as, for instance, its propulsion system.

Although this broad concept is by no means new, in the past its implementation has usually involved some form of electrical control circuitry which governed operativeness of the engine ignition system. The Santi et al U.S. Pat. No. 3,521,612 and the Harkness U.S. Pat. No. 3,782,084 are representative of such prior interlocks.

Most engines used to power lawn and garden equipment now have Bendix-type starters, either of the manual pull-rope variety covered by the Harkness et al U.S. Pat. No. 3,465,740 or the electric variety as in the Harkness U.S. Pat. No. 3,526,146. That being the case, this invention deals with the problem of unsafe starting of an engine having a Bendix-type starter, and solves that problem by the provision of a mechanical lock-out mechanism that prevents the driving pinion of the starter from advancing into meshing engagement with the ring gear on the engine flywheel when starting of the engine is to be prevented.

The lock-out mechanism comprises a lever pivotally mounted on a wall of the starter housing in position to engage a surface of the driving pinion that is normal to its axis and thereby prevent axial translation of the pinion towards the ring gear, but only when that lever is restrained against rotation about its pivotal mounting. A feature of the invention resides in the fact that such restraint is automatically effected by a blocking member that is also pivotally mounted on the starter housing and is coincidentally moved to its operative position whenever a manual control on the engine-powered equipment is advanced to drivingly connect the engine with an engine driven instrumentality.

To facilitate engagement of the blocking member with the pivoted lever as the blocking member is moved to its operative blocking position, it has a cam surface to ride up onto the lever.

Since power lawn mowers and kindred equipment often are operated by people prone to misunderstand or disregard instructions, someone is apt to actuate the starter while the control - which coincidentally governs the operativeness of the lock-out mechanism - is not fully retracted, or even apt to advance the control with one hand and thereby place the lock-out mechanism in its operative condition, while - with the other hand - the starter is activated. In either event, serious damage to the lock-out mechanism or even the starter could result if the lock-out mechanism was incapable of accommodating or yielding to such unwise conduct of the operator. To do so, the pivoted blocking member has sufficient resilient yieldability to flex in the event the advancing or advanced starter pinion restrains the pivoted lever against being moved by the cam surface on the blocking member.

Another feature of this invention is the provision of adjustability in the mounting of the lock-out mechanism to enable the same to be so positioned that it will reliably prevent meshing engagement of the starter pinion with the ring gear when engine starting is to be prevented, despite the rather large tolerances that characterize Bendix-type starters like those with which this invention is concerned.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
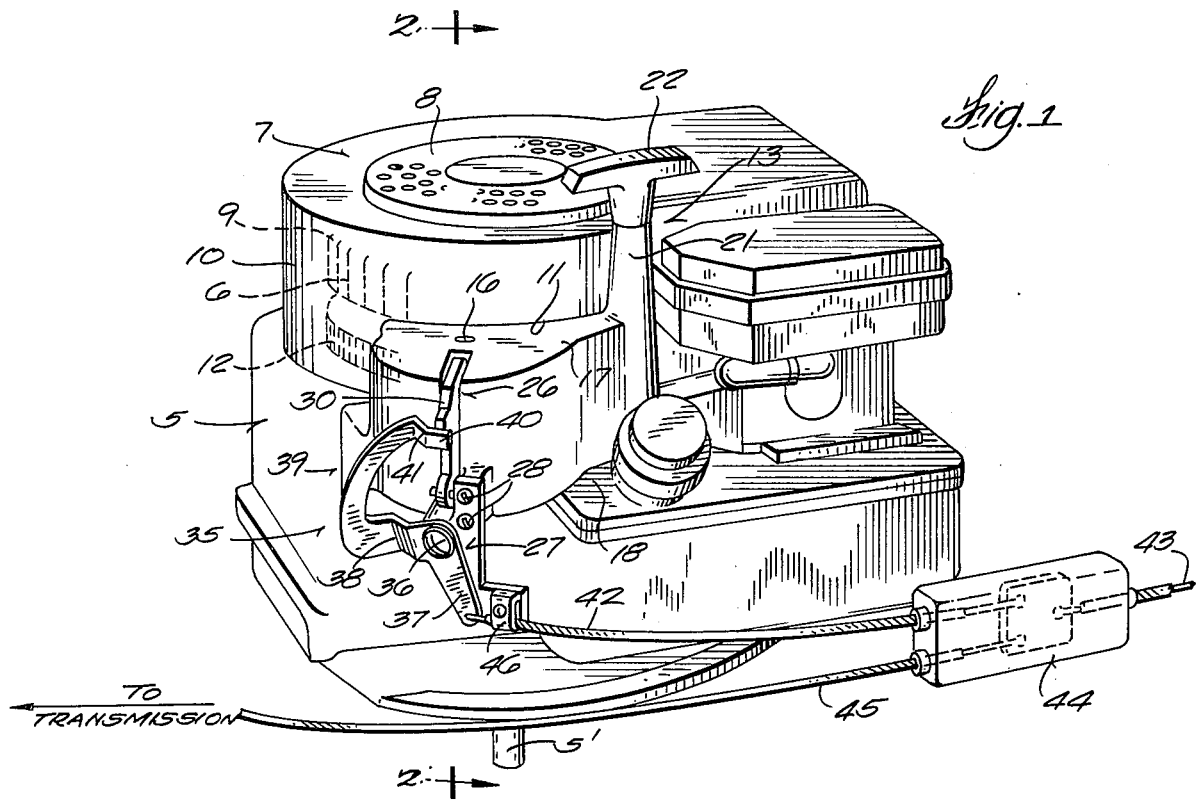
FIG. 1 is a perspective view of a single cylinder internal combustion engine with a Bendix-type starter of the pull rope variety, equipped with the lock-out mechanism of this invention.
Figure 2:
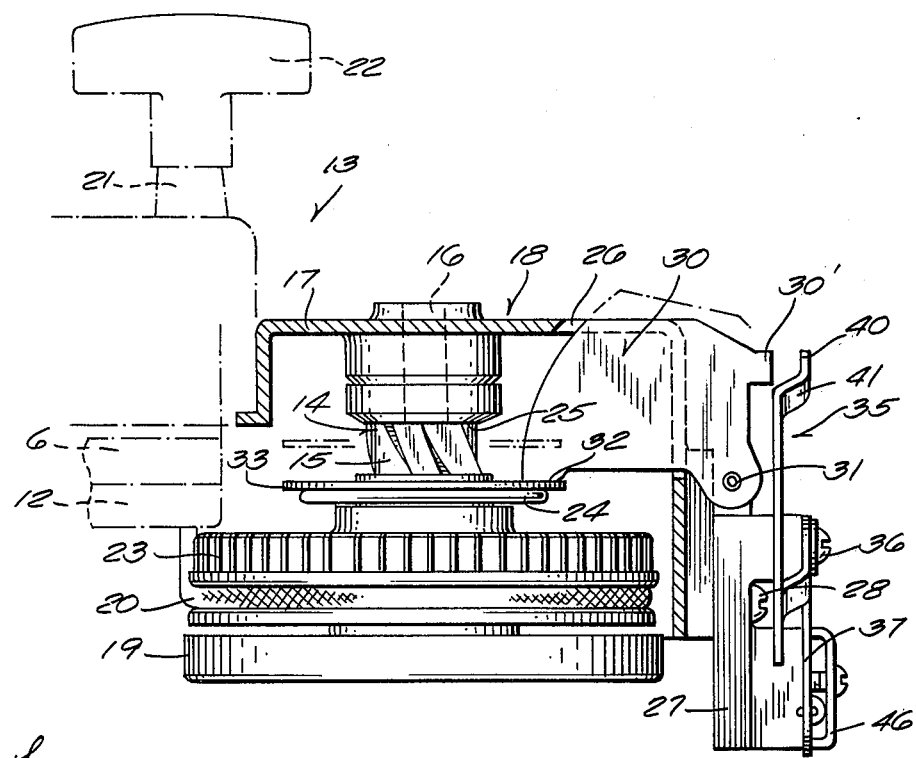
FIG. 2 is a sectional view through the starter of the engine, taken through FIG. 1 substantially on the plane of the line 2-2.
Figure 3:
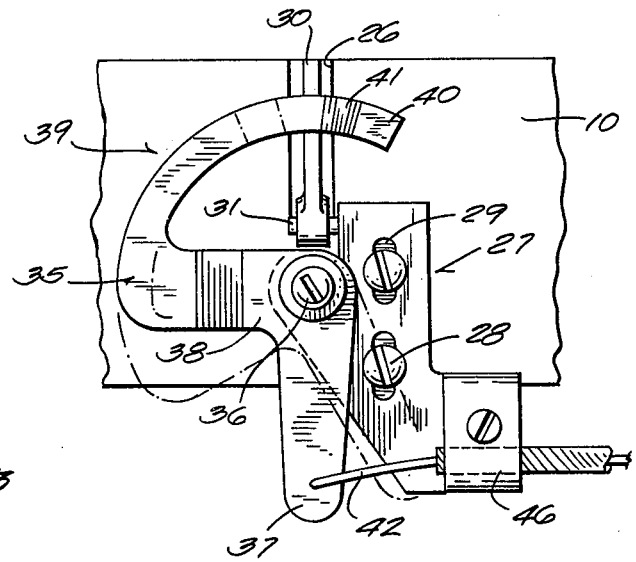
Figure 4:
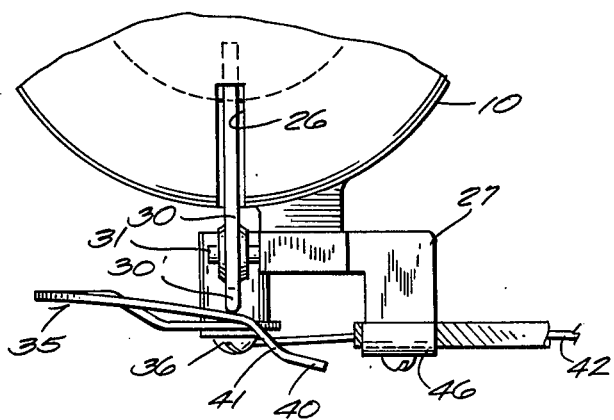

FIG. 3 is a side view of the structure shown in FIG. 2 illustrating the active or operative position of the blocking member of the lock-out device in full lines and its inactive or inoperative position in dotted lines in which it is shown in FIG. 1; and FIG. 4 is a top view of that same structure illustrating how the resilient yieldability of the blocking member accommodates unintended or accidental actuation of the blocking member to its operative position after the starter has been activated.

Referring now more particularly to the drawings, the numeral 5 designates the crankcase or body of a single cylinder internal combustion engine, the crankshaft 5' of which is vertical in the normal operating position of the engine. The usual flywheel 6 is mounted on the upper end of the crankshaft and a blower housing or shroud 7 encloses the flywheel to direct cooling air drawn through a screened inlet opening 8 by impeller blades 9 on the flywheel onto the hot surfaces of the engine. The shroud 7 has a side wall 10 with an opening 11 at one side thereof to afford access to the adjacent peripheral portion of the flywheel, and - more particularly - to a ring gear 12 on the periphery of the flywheel.

A Bendix-type starter, designated generally by the numeral 13, is mounted on the engine crankcase in juxtaposition to the opening 11 in the side wall of the blower housing. The starter is substantially identical with that of the aforesaid Harkness et al U.S. Pat. No. 3,465,740. The starter is, therefore, of the pull rope variety, though for purposes of this invention it could be electrically driven, as in the Harkness U.S. Pat. No. 3,526,146. In either case, a drive shaft 14 with steeply pitched helical splines 15 is freely rotatably journaled on a spindle 16 that is anchored to the top wall 17 of the starter housing 18. The drive shaft is held against axial displacement by being confined between the top wall 17 and a stop abutment (not shown) fixed to the bottom end of the spindle 16.

At the bottom of the drive shaft there is a rope pulley 19 into which the starting rope 20 is wound as the drive shaft is rotated by a spiral recoil or rewind spring (not shown) in the manner fully explained in the aforesaid Harkness et al patent. The free end portion of the rope 20 projects through a tubular boss 21 rising from the top of the starter housing and has a handle 22 fixed thereto to enable the application of an upward pull on the starter rope, during which the tension in the recoil or rewind spring is increased.

Mounted on the helically splined drive shaft 14 is the driving pinion 23 of the starter. By virtue of the splined-threaded-connection between the shaft and the pinion, relative rotation between the shaft and the pinion 23 in one direction propels the pinion upward into meshing engagement with the ring gear 12, while relative rotation therebetween in the opposite direction retracts the driving pinion from engagement with the ring gear. Such relative rotation in the first direction results from a pull on the starting rope and the impositive restraint against rotation of the driving pinion imposed thereon by a friction device - indicated at 24 in FIG. 2, and fully described in the aforesaid Harkness et al patent.

When the driving pinion has been fully meshed with the ring gear, further upward travel thereof is arrested by its collision with an abutment 25 on the drive shaft so that it then turns with the shaft and, in so doing, imparts engine starting torque to the ring gear. When the engine starts, the ring gear overruns the driving pinion and thus produces relative rotation between the driving pinion and the shaft in the opposite direction to effect retraction of the driving pinion.

The foregoing description of the manner in which the starter operates has been included out of an overabundance of caution that the disclosure be fully complete. To those skilled in the engine starter art, it is no doubt unnecessary and redundant.

A description of the lock-out mechanism of this invention now follows;

The entire lock-out mechanism is mounted on the side wall of the starter housing 18 in juxtaposition to a slot 26 that extends through its top and side walls by means of a mounting block 27. Clamping screws 28 that pass through elongated holes 29 in the mounting block secure the block and hence the entire lock-out mechanism, to the starter housing in a manner that provides for proper placement of the lock-out mechanism with respect to the starter.

The lock-out mechanism per se comprises a lever 30 pivoted to the mounting block by a pin 31 and seated in the slot 26. The lever 30 is freely edgewise movable in the slot about the fixed axis of the pin 31 and its center of gravity is so placed with respect to that axis that the outer end 32 of the lever at all times rests on the top of a flange 33 which forms an integral part of the hub of the driving pinion 23. Hence, unless the lever is restrained against rocking about its pivot (in the clockwise direction as viewed in FIG. 2) it will simply be lifted by the ascending driving pinion, during propulsion thereof, into meshing engagement with the ring gear - and, of course, upon retraction of the driving pinion after the engine starts, the lever 30 follows the descending flange 33. Hence, as long as nothing interferes with the freedom of the lever to rock about its pivot, the starter functions in the normal way.

However, if the lever 30 is held against rocking - in the clockwise direction in FIG. 2 - it will not allow the driving pinion to move into meshing engagement with the ring gear. This interference with the advance of the driving pinion has no injurious effect upon the starter, since - upon being restrained against axial movement - the driving pinion simply rotates in unison with the drive shaft as the latter is rotated by a pull applied on the starting rope, it being understood that the engagement between the flange 33 and the lever 30 accommodates the necessary sliding action resulting from rotation of the flange 33.

To restrain the lever 30 against clockwise rotation and thereby hold the driving pinion from meshing engagement with the ring gear, a blocking member 35 is provided. A stud 36 threaded into the mounting block pivotally mounts the blocking member for rotation about an axis at right angles to that of the pivot pin 31.

The blocking member is a sheet metal stamping shaped to provide right-angularly disposed arms 37 and 38 that radiate from the hub of the blocking member and hence from the axis about which it rocks. The arm 37 provides an actuating lever that is connectable with a remotely located control lever in a manner to be described, and by which rocking motion is imparted to the blocking member coincidentally with the advance and retraction of that control lever to connect and disconnect the engine to and from certain engine driven instrumentalities - as, for instance, the propulsion system of the implement.

The arm 38 has an arcuate extension 39 projecting from its outer end concentrically to the pivot axis. For the major portion of its length, this arcuate extension lies in a plane that is closer to the side of the starter housing than its end portion 40 which is joined thereto by an inclined cam-forming step 41.

In all positions of the blocking member some part of the arcuate extension 39 of its arm 38 lies athwart the slot 26 and hence across the path of outward swinging motion of the lever 30. If it is the outer end portion 40 of the arcuate extension 39 that occupies this location, the lever 30 is free to rock about its pivot as the starter pinion advances towards meshing engagement with the ring gear, but when any part of the arcuate extension inwardly of its cam-forming step 41 is opposite the slot, a pad 30' on the lever 30 is engaged thereby and, as a result, the lever 30 is restrained against outward rocking motion, with the result that the starter pinion cannot be meshed with the ring gear.

With the cam forming step 41 opposite the slot, some advance of the starter pinion towards the ring gear may take place, depending upon which part of the cam surface is so positioned. It is this "twilight zone" that gives rise to the possibility of damage to the lock-out mechanism and also the starter, that must be compensated to make the device foolproof.

This required accommodation is achieved by the simple expedient of making the blocking member or, more specifically, its arcuate extension 39 resiliently yieldable. Since the blocking member is a steel stamping, the attainment of that resilient yieldability is no problem. Because of it, as shown in FIG. 4, any condition that pits the upward thrust of the helically splined connection between the starter pinion and its shaft against a force holding the arcuate extension against the lever 30 - or tending to do so, as when a rocking force is applied to the blocking member tending to cause the cam portion 41 to climb up onto the lever 30 - will be accommodated by flexure of the arcuate extension of the blocking member.

Since the arcuate extension 39 has a considerable arcuate dimension, the blocking member performs its blocking function throughout a substantial range of its rocking movement. This is an advantage in that it affords latitude in operatively connecting the blocking member to the control by which startability of the engine is to be governed. While that connection may be effected in any one of several ways, it is most conveniently done by connecting one end of a Bowden wire 42 to the arm 37 and connecting the other end thereof to another Bowden wire 43 that leads from the manually operable control lever (not shown) by which the driving connection between the engine and engine-driven instrumentalities is governed. The connection between the two Bowden wires is conveniently accomplished by means of a conventional coupler 44 into one end of which the wire 43 enters and from the other end of which the wire 42 - and a third wire 45 - leave, the latter going to the instrumentalities to be controlled.

As noted hereinbefore, the relatively large tolerances that are inevitable in Bendix-type starters for which this invention is designed, caused at least in part by the fact that the starting pinion and its helically splined shaft - and much of the rest of the assembly - are molded of plastic, makes it necessary to be able to adjust the location of the lock-out mechanism on the starter housing if the device is to be reliably effective in its function of preventing meshing engagement of the starter pinion with the ring gear when starting of the engine is to be prevented. For reliable operation, the lock-out mechanism must be so positioned that when its lever 30 is restrained from rocking about its pivot by the engagement of the blocking member 35 with its pad 30', the lever will just contact the top of the flange 33 when the pinion is in its bottommost retracted position. The adjustability necessary to meet that requirement is achieved by mounting the entire lock-out mechanism - including the anchor 46 for the sheath of the Bowden wire 42 - on the mounting block 27 and providing for vertical adjustment of the location of the mounting block on the side wall of the starter housing. It is for that purpose that the holes 29 in the mounting block are elongated.

OPERATION

Although the operation of the lock-out mechanism of this invention is no doubt understandable from the foregoing description, the following brief recapitulation is included for convenience.

The starter, being of the Bendix-type, has a driving pinion helically splined to a drive shaft to travel along the shaft into mesh with the ring gear on the engine flywheel upon relative rotation in one direction between the drive shaft and the driving pinion. A pull on the starting rope and frictional resistance to rotation of the driving pinion brings about the aforesaid relative rotation. Obviously, the starting rope can be replaced by an electric motor.

Unless the driving pinion is held against movement along the drive shaft, the aforesaid relative rotation results in meshing engagement of the driving pinion with the ring gear on the engine flywheel and the application of engine starting torque as a result of blocking further axial motion of the driving pinion along the shaft.

When starting of the engine is to be prevented, the driving pinion is restrained against axial motion along its drive shaft by preventing rotation of the lever 30 from the position it occupies when the driving pinion is fully retracted. This is done by moving the blocking member 35 to its operative position in which its arcuate extension 39 contacts the pad 30' on the lever 30.

Since the blocking member is shifted to and from its operative position preventing starting of the engine, concomitantly with advance and retraction of the manually operable control lever by which the propulsion system of the machine - or some other selected power driven mechanism - is drivingly connected with the engine, it follows that when that control lever is in its advanced position, the engine can not be started, and - conversely - when that control lever is fully retracted, there is no interference with the capability of the starter to start the engine.

Those skilled in the art will appreciate that the invention can be embodied in forms other than as herein disclosed for purposes of illustration.

The invention is defined by the following claims:

We claim:

1. In combination with an engine starter of the Bendix-type wherein relative rotation in one direction between a driving pinion and a drive shaft with which it has a helically splined connection propels the driving pinion axially along the shaft into mesh with a ring gear on the flywheel of an engine with which the starter is associated and relative rotation in the opposite direction between the driving pinion and the shaft propels the driving pinion to a retracted position out of mesh with the ring gear, a mechanical lock-out adapted to be coupled to a remotely located control by which a function of the engine is activated, to prevent starting of the engine if said control has been actuated to activate said engine function, said lock-out comprising:

A. means providing a surface that is fixed with respect to the driving pinion, is substantially normal to its axis and faces in the direction the pinion moves as it leaves its retracted position;
   B. a rigid movable restraining member;
   C. pivot means mounting said restraining member and constraining the same to pivotal movement in an arcuate path about an axis that is fixed with respect to the retracted position of the driving pinion,
   a part of said rigid restraining member that is spaced from the axis of the pivot means being in contact with said surface so that axial movement of the driving pinion from its retracted position cannot take place if concomitant pivotal movement of the restraining member about the axis of said pivot means is prevented,
   the contact between said restraining member and said surface being at a point relatively close to the axis of the driving pinion and accommodating rotation of said surface;
   D. a blocking member mounted to move along a path fixed with respect to the path of movement of said restraining member between an active position in which it blocks pivotal movement of the restraining member in the direction it must move for the driving pinion to leave its retracted position and an inactive position in which it does not interfere with such pivotal movement of the restraining member; and
   E. motion transmitting means through which said blocking member is connectible with the remotely located control and by which the blocking member is moved to its active position concomitantly with actuation of the control to activate said engine function.

2. The structure defined by claim 1, wherein the drive shaft and driving pinion are in a housing having top and side walls, with the drive shaft fixed with respect to the housing and its axis vertical, the helically splined connection between the driving pinion and the drive shaft being so pitched that the driving pinion moves upward upon being propelled from its retracted position into mesh with the ring gear; and further characterized by:

1. the side wall of the housing having a vertical slot;
2. the rigid restraining member being a lever that projects through the slot and has said part thereof that is in contact with said surface located inside the housing and resting on said surface and another portion thereof located outside the housing;
3. the fixed pivot means for the lever being supportingly connected with the housing side wall and its axis being horizontal and so located with respect to the center of gravity of the lever that the weight of the lever keeps its said part in contact with said surface so that upon upward propulsion of the driving pinion from its retracted position the lever swings outward with respect to the housing side wall; and
4. the blocking member being pivotally mounted on the exterior of the housing side wall to rock about a horizontal axis at right angles to the axis about which the restraining lever swings, with a part of the blocking member lying athwart said slot in position to engage said portion of the lever and thereby prevent outward swinging thereof when the blocking member is in its active position.

3. The structure defined by claim 2, wherein the connection between said pivot means and the housing side wall is vertically adjustable so that despite relatively large variations in the dimensional tolerances of the starter assembly, the restraining lever can be so related to the driving pinion that it reliably holds the driving pinion in its retracted position when the blocking member prevents outward swinging of the restraining lever.

4. The structure defined by claim 1, wherein said pivot means comprises a block with a pivot pin projecting therefrom into a bearing hole in the restraining lever; and wherein the vertically adjustable connection between said pivot means and the housing side wall comprises means for securing said block to the housing side wall in a selected position of adjustment.

5. The structure defined by claim 4, wherein the blocking member is also pivotally connected to said block.

6. The structure defined by claim 2, wherein the part of the blocking member that lies athwart the slot in the housing side wall is concentric to the axis about which the blocking member rocks and for a considerable portion of its angular extent is sufficiently close to the housing side wall to prevent outward swinging of the restraining lever so that placement of the blocking member in its active position does not entail critically accurate adjustment.

7. The structure defined by claim 6, wherein the blocking member is shaped to provide a cam surface leading to said part of the blocking member that - in an active position of the blocking member - prevents outward swinging of the restraining lever to facilitate the engagement of said part with the restraining lever as the blocking member is moved from its inactive position to its active position.

8. The structure defined by claim 7, wherein the blocking member has sufficient inherent resilient yieldability to flex in the event it is moved from its inactive position towards its active position while the restraining lever is in an outwardly swung position as a result of the starter having been actuated.

9. In combination with an engine starter of the Bendix-type, wherein a driving pinion having a helically splined connection with a drive shaft is propelled into mesh with a ring gear on the flywheel of an engine with which the starter is associated upon relative rotation between the drive shaft and the pinion, and then by rotation in unison with the shaft imparts engine starting torque to the ring gear, a mechanical lock-out to restrain the driving pinion from meshing engagement with the flywheel ring gear when starting of the engine is to be prevented, comprising:

A. a lever pivotally mounted to rock about an axis that is fixed with respect to the axial position of the drive shaft, said lever having a part thereof lying in the path of axial movement of the driving pinion towards meshing engagement with the flywheel ring gear, so that unless prevented from doing so, said lever is rocked about its pivotal mounting by said axial movement of the driving pinion towards meshing engagement with the engine ring gear;

B. a blocking member movable in a path fixed with respect to the pivot axis of said lever between an inactive position in which it does not interfere with rocking movement of said lever by said axial movement of the driving pinion towards meshing engagement with the engine ring gear and an active position engaging said lever and preventing said rocking movement thereof; and C. motion transmitting means through which said blocking member is connectable with a remotely located actuator by which a function of the engine is controlled and through which said blocking member is movable to and held in its active position, whereby the operativeness of the starter can be made dependent upon the control of said function of the engine.

10. The invention defined by claim 9, wherein the starter has a housing including a wall embracing its drive shaft and the driving pinion thereon,
  wherein said wall has a slot therethrough lying in a plane radial to the axis of the drive shaft and driving pinion, and
  wherein said lever occupies said slot and is constrained to swing in said plane with portions thereof inside and outside the housing.

11. The invention defined by claim 10, wherein said blocking member is outside said housing and constrained to rocking movement about an axis fixed with respect to the housing and parallel to said plane.

* * * * *